United States Patent [19]

Uratani

[11] 3,810,346
[45] May 14, 1974

[54] METHOD FOR REMOVAL OF OIL AND WATER FROM COMPRESSED AIR

[75] Inventor: Eiichi Uratani, Tokyo, Japan

[73] Assignee: Sumida Equipment Industries, Inc., Tokyo, Japan

[22] Filed: Sept. 1, 1972

[21] Appl. No.: 285,871

[30] Foreign Application Priority Data
Mar. 7, 1972  Japan............................ 47-22832

[52] U.S. Cl............................ 55/29, 62/85, 62/93
[51] Int. Cl....................... B01d 53/02, F25b 47/00
[58] Field of Search........................... 55/29–32, 84, 55/89; 62/13, 17, 85, 193, 317

[56] References Cited
UNITED STATES PATENTS

| | | | |
|---|---|---|---|
| 3,589,104 | 6/1971 | Panzarella............................ | 55/32 |
| 3,407,617 | 10/1968 | Wischmeyer et al.................. | 62/85 |
| 2,988,171 | 6/1961 | Arnold et al............................ | 55/32 |
| 3,490,201 | 1/1970 | Colvin et al. ........................... | 55/34 |

Primary Examiner—Charles N. Hart
Attorney, Agent, or Firm—Hans Berman

[57] ABSTRACT

Compressed air contaminated with water vapor and a mist of oil droplets is purified by spraying into the air a cold, liquid refrigerant ($CCl_3F$, $CHCl_2F$, $C_2Cl_3F_3$, $C_2Cl_2F_4$) which cools the air below its dew point without itself evaporating and absorbs the oil. The precipitating mixture of oil-bearing solvent and water is permitted to settle. An upper aqueous layer of water is removed by overflow, and the lower layer of solvent containing oil is recycled until it contains too much oil, whereupon it is separated from the oil by distillation.

5 Claims, 1 Drawing Figure

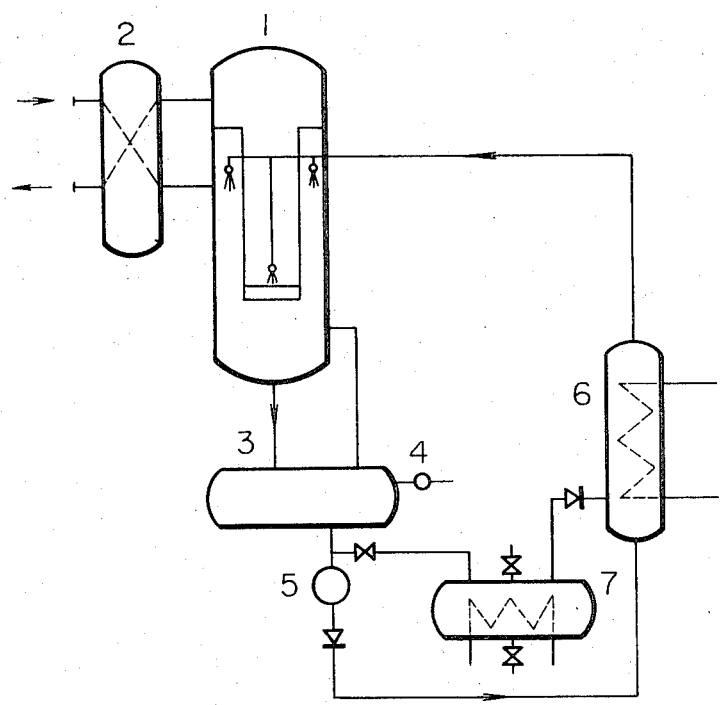

METHOD FOR REMOVAL OF OIL AND WATER FROM COMPRESSED AIR

This invention relates to a method for removing oil and water from the air exhausted from a compressor by refrigerating the air.

It has been the practice heretofore for deoiling and dehydrating compressed air to employ solely or jointly a refrigeration method by which compressed air is cooled and condensed, or a chemical method relying on dehydration inherent in calcium chloride and the like, or a physical method relying on dehydration inherent in active alumina gel and the like. It has also previously been common to mechanically capture droplets of oil and water by way of centrifugal separation or filtration.

The practices hitherto utilized are incomplete in deoiling air, particularly in the case of air containing antiemulsifying oil, since the oil is completely separated from the water and dispersed in the air as a form of extremely fine mist.

A screw type air compressor which has been widely used of late years and which requires much oil for the lubrication, cooling and sealing, allows much oil to remain in the compressed air, for all its outstanding functions. For this reason, such a screw compressor has failed to overcome such defects as the compressed air is inferior in quality and thus restricted in use and also much oil is consumed. In addition, the oil removed from the compressed air has a lower specific gravity than water and, thus, remains suspended over water so that it is not easy to separate the oil from water for reuse of the oil.

It is, therefore, an object of the present invention to provide a method which is capable of the refrigeration of the compressed air and the removal of oil therefrom and dehydration thereof, and which is adapted to readily separate the oil from water removed from the compressed air.

According to the invention, a coolant is sprayed on the air discharged from the air compressor for direct heat exchange between the coolant and the air to cool the air while the oil finely divided as a mist may be captured, dissolved and removed by the coolant. A mixture of oil and coolant is separated from condensed water by the difference in their specific gravities and is then heated to separate the oil from the coolant.

The accompanying drawing shows a diagrammatic view of an apparatus in which the present invention is embodied.

Preferred properties of coolant used for carrying out the principle of the invention are as follows:

1. The boiling point of coolant under the atmospheric pressure is higher than the freezing point of water but lower than the boiling point thereof. It is preferably at 0° – 50° C. (The coolant should not be evaporated under treatment on the compressed air.)
2. The solubility of coolant is high with respect to the oil but is low with respect to the water (for the purpose of capturing and dissolving the oil and of facilitating its separation from the condensed water.)
3. The coolant should be of high specific gravity (to allow the specific gravity of the mixture of oil and coolant to be more than that of water to thus suspend the water over the mixture thereby effecting a distinguishable separation from each other.

The coolant must have low viscosity.

4. The heat of vaporisation of the coolant is low (to heat the mixture of oil and coolant for evaporating and collecting the coolant.)
5. The coolant should be noninflammable, non-toxic, and non-corrosive to machinery and tools.

The following halogenated hydrocarbons have been found to be eminently effective as the coolant used in carrying out the invention as a result of various experiments in view of the aforementioned properties of coolant.

| Identification as Refrigerant | Chemical Formula | Name of Compound |
|---|---|---|
| R-11 | $CCl_3F$ | Trichlorofluoromethane |
| R-21 | $CHCl_2F$ | Dichlorofluoromethane |
| R-113 | $C_2Cl_3F_3$ | Trichlorotrifluoroethane |
| R-114 | $C_2Cl_2F_4$ | Dichlorotetrafluoroethane |

A preferred embodiment of the invention will be hereinafter explained and described in the accompanying drawing.

The compressed air is led from a compressor (not shown) through an economizer 2 to a cylindrical absorption vessel 1 within which the coolant such as the aforementioned chemical compounds in the previously cooled state is sprayed over the compressed air. The compressed air is cooled to a temperature lower than its dew point by direct heat exchange of coolant and air. It is noted that the coolant does not evaporate so that the air is cooled by heat exchange due to mere difference in temperature between coolant and air but not to evaporation of the coolant. In this manner, water vapor in the air is condensed and the oil finely divided as droplets is dissolved and captured in the coolant. The condensed water and the mixture of oil and coolant are led to a settling tank 3 and are separated into two liquid phases by the difference in specific gravity. The purified air is discharged through the economizer 2.

Hitherto, a difficulty has been involved in the separation of water from oil for disposition since the oil is normally susperposed on the water where they are combined. According to the present invention, the water can be supernatant so that the supernatant water may be discharged from the tank 3 by overflow from a drain valve 4 when the condensed water increases in its quantity. On the other hand, the mixture of oil and coolant is forcibly fed to a cooler 6 and cooled thereby into the and then fed to the absorption vessel 1 to again serve for spray on the compressed air. In this manner, the coolant may be used in a cycle. If the coolant contains a high percentage of oil captured and dissolved, it is fed to an evaporator 7 and heated by a heater therein to the boiling point of the coolant upon decompression thereof to the atmospheric pressure. The evaporated coolant is condensed by the cooler for its re-use. The oil remains in the evaporator since it is not evaporated at the boiling point of coolant. This oil is discharged from a drain valve and then re-used.

In an example, R-11 liquid with weight of 20kg at flow rate of 450l/hour, temperature of 0° C at the entrance to the absorption vessel 1 was cyclically dispersed in a stream of compressed air having a gauge pressure of $7kg/cm^2$, flow rate of $90Nm^3$/hour, temperature of 35° C at the entrance to the vessel. The compressed air and coolant had a temperature of 8° C at the exit from the vessel while the oil was removed with yield of 3.25g after ten hours' operation. One half of the coolant weighing 10 kg was regenerated to to hold the oil content in the coolant to less than 1 percent (weight) per 600 hours' (about 2 months) operation, however, the oil content in the coolant may be increased up to 10 percent.

As precisely set forth hereinbefore, according to the invention, the compressed air is very readily cooled by dispersing the coolant therein and the oil finely divided as a mist in the compressed air is captured and dissolved in the coolant. Further, not only is the condensed water readily separated from the mixture of oil and coolant and thus disposed of, but also the mixture of oil and coolant can be separated into the oil and coolant so that it is possible to regenerate the oil and coolant for their use. Thus, the refrigeration of compressed air and the oil removal therefrom, and dehydration can be economically and efficiently made.

The invention has been described in detail with particular reference to preferred embodiments thereof, but it will be understood that variations and modifications can be effected within the spirit and scope of the invention.

What we claim is:

1. A method of removing water vapor and lubricating oil droplets from compressed air which comprises:
   a. dispersing a liquid coolant in said compressed air carrying said water vapor and said oil droplets,
      1. the temperature of said coolant being low enough to cool said air below the dew point thereof,
      2. the amount of said coolant being sufficient to avoid heating said coolant above the boiling point thereof by contact with said air,
      3. said coolant being a better solvent for said oil than for water,
      4. the specific gravity of said solvent being substantially greater than that of water, whereby oil of said droplets is dissolved in said coolant and water vapor is condensed while said air is being purified;
   b. separating said coolant having said oil dissolved therein and said condensed water vapor from the purified compressed air;
   c. permitting the separated oil-bearing coolant and condensed water vapor to settle in respective superposed layers, and
   d. separately recovering said layers.

2. A method as set forth in claim 1, wherein said liquid coolant and said compressed air carrying said water vapor and said oil droplets are fed in respective continuous streams to an absorption zone for said dispersing of the coolant in the air, said coolant having said oil dissolved therein and said condensed water vapor are withdrawn jointly from said absorption zone and separately from said purified air to a settling zone for said settling, and the coolant in one of said recovered layers is cooled and thereafter returned to said dispersing zone.

3. A method as set forth in claim 1, wherein said coolant has a boiling point of 0° to 50° C at atmospheric pressure, and the temperature of said compressed air is lower than the boiling point of said coolant at the pressure of said air.

4. A method as set forth in claim 3, wherein said coolant is a halogenated hydrocarbon selected from the group consisting of trichlorofluoromethane, dichlorofluoromethane, trichlorotrifluoroethane, and dichlorotetrafluoroethane.

5. A method as set forth in claim 4, wherein said layer of oil-bearing coolant is heated to a temperature above the boiling point of said coolant and below the boiling point of said oil, and the resulting coolant vapor is condensed and further cooled below the boiling point of said coolant and thereafter dispersed in an additional amount of said compressed air carrying said water vapor and said oil droplets.

* * * * *